US009777546B2

(12) United States Patent
Hoover et al.

(10) Patent No.: US 9,777,546 B2
(45) Date of Patent: Oct. 3, 2017

(54) RAM PACKER EXTRACTION TOOL

(75) Inventors: Richard Ryan Barr Hoover, Fulshear, TX (US); Sankar Norman Thiruvannamalai, Houston, TX (US); Alexandre Montini Accioly Afonso, Katy, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 1561 days.

(21) Appl. No.: 13/277,883

(22) Filed: Oct. 20, 2011

(65) Prior Publication Data

US 2013/0097836 A1 Apr. 25, 2013

(51) Int. Cl.
| | |
|---|---|
| E21B 33/06 | (2006.01) |
| B23P 19/02 | (2006.01) |
| B25B 27/00 | (2006.01) |
| B23K 37/053 | (2006.01) |

(52) U.S. Cl.
CPC ............ *E21B 33/062* (2013.01); *E21B 33/06* (2013.01); *B23K 37/053* (2013.01); *B23P 19/025* (2013.01); *B25B 27/00* (2013.01); *Y10T 29/49821* (2015.01); *Y10T 29/49822* (2015.01); *Y10T 29/53983* (2015.01)

(58) Field of Classification Search
CPC ...... E21B 33/06; E21B 33/062; B23P 19/025; B25B 27/00; B23K 37/053; Y10T 29/49821; Y10T 29/49822; Y10T 29/53983
USPC ....... 29/426.1, 426.4, 281.6, 426.5; 251/1.3; 157/1.2
See application file for complete search history.

(56) References Cited

U.S. PATENT DOCUMENTS

| | | | | | |
|---|---|---|---|---|---|
| 779,028 | A | * | 1/1905 | Condon | E01B 29/26 254/24 |
| 2,592,197 | A | * | 4/1952 | Schweitzer, Jr. | 251/1.3 |
| 2,690,320 | A | * | 9/1954 | Shaffer et al. | 251/1.3 |
| 2,706,103 | A | * | 4/1955 | Stambaugh | B25C 11/02 254/19 |
| 2,732,741 | A | * | 1/1956 | Mueller-Strobel | B67B 7/164 81/3.2 |
| 2,735,649 | A | * | 2/1956 | Swallert | B25C 11/02 254/18 |
| 2,797,889 | A | * | 7/1957 | Talboys | E01B 29/26 254/18 |
| 2,902,751 | A | * | 9/1959 | Sommer | 29/261 |
| 3,069,761 | A | * | 12/1962 | Sommer | 29/252 |
| 3,076,673 | A | * | 2/1963 | Kaplan et al. | 294/67.33 |
| 3,156,289 | A | * | 11/1964 | Dragoo | B60C 25/132 157/1.2 |
| 3,354,928 | A | * | 11/1967 | Copeland et al. | 157/1.2 |

(Continued)

OTHER PUBLICATIONS

Young, PCT International Search Report and Written Opinion for PCT/US12/58561, Jan. 4, 2013.

*Primary Examiner* — Christopher Besler
*Assistant Examiner* — Bayan Salone
(74) *Attorney, Agent, or Firm* — Eubanks PLLC

(57) ABSTRACT

A system to remove a ram packer from a ram block is provided. In one embodiment, the system includes an extraction tool having opposing jaws configured to engage a ram packer installed in a ram block. The system may also include an actuator configured to move the opposing jaws to facilitate separation of the ram packer from the ram block. Additional systems, devices, and methods are also disclosed.

7 Claims, 10 Drawing Sheets

(56) References Cited

U.S. PATENT DOCUMENTS

| | | | |
|---|---|---|---|
| 3,644,980 A * | 2/1972 | Class et al. | 219/201 |
| 3,655,232 A * | 4/1972 | Martelee | 294/67.33 |
| 4,538,793 A * | 9/1985 | Dieringer et al. | 254/18 |
| 4,541,639 A * | 9/1985 | Williams, III | 277/325 |
| 5,067,529 A * | 11/1991 | Gonzalez-Miller | B09B 3/0058 100/104 |
| 5,127,623 A * | 7/1992 | McDugle | 251/1.3 |
| 5,174,344 A * | 12/1992 | Gonzalez-Miller | B09B 3/0058 100/102 |
| 5,251,870 A * | 10/1993 | Ward | 251/1.3 |
| 5,285,827 A * | 2/1994 | Gonzalez-Miller | B09B 3/0058 100/102 |
| 5,575,452 A * | 11/1996 | Whitby et al. | 251/1.3 |
| 5,603,481 A * | 2/1997 | Parker et al. | 251/1.3 |
| 5,701,649 A * | 12/1997 | Reesor et al. | 29/252 |
| 6,089,526 A * | 7/2000 | Olson | 251/1.3 |
| 6,266,859 B1 * | 7/2001 | Hernandez | B25B 27/023 29/256 |
| 6,367,804 B1 * | 4/2002 | Watts | 277/325 |
| 6,458,324 B1 * | 10/2002 | Schinzel | 422/65 |
| 6,681,858 B2 * | 1/2004 | Streater | 166/301 |
| 6,848,506 B1 * | 2/2005 | Sharp et al. | 166/301 |
| 6,974,135 B2 * | 12/2005 | Melancon et al. | 277/325 |
| 7,509,722 B2 * | 3/2009 | Shahin et al. | 29/407.09 |
| 7,520,041 B1 * | 4/2009 | Aguilar | B25B 27/023 29/255 |
| 7,665,530 B2 * | 2/2010 | Wells et al. | 166/377 |
| 7,832,449 B2 * | 11/2010 | Levin et al. | 157/1.17 |
| 8,015,683 B2 * | 9/2011 | Hume | 29/255 |
| 8,308,092 B2 * | 11/2012 | Ramun | 241/101.73 |
| 8,544,946 B2 * | 10/2013 | Holden | 297/197 |
| 8,684,432 B2 * | 4/2014 | Saka et al. | 294/119.1 |
| 2003/0024705 A1 * | 2/2003 | Whitby et al. | 166/363 |
| 2004/0003490 A1 * | 1/2004 | Shahin et al. | 29/464 |
| 2004/0113108 A1 * | 6/2004 | Ward | 251/1.3 |
| 2005/0006087 A1 * | 1/2005 | Melancon et al. | 166/106 |
| 2007/0235145 A1 * | 10/2007 | Levin et al. | 157/1.22 |
| 2008/0023917 A1 * | 1/2008 | Khandoker | 277/324 |

* cited by examiner

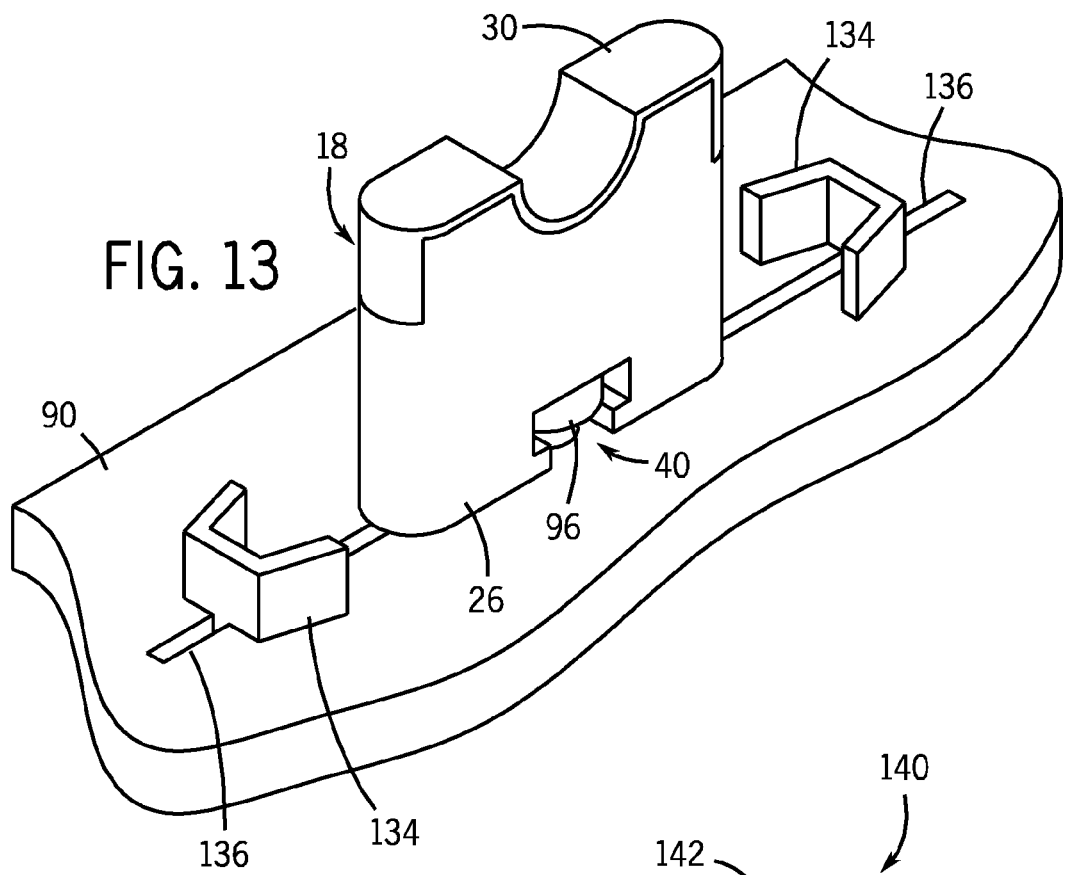
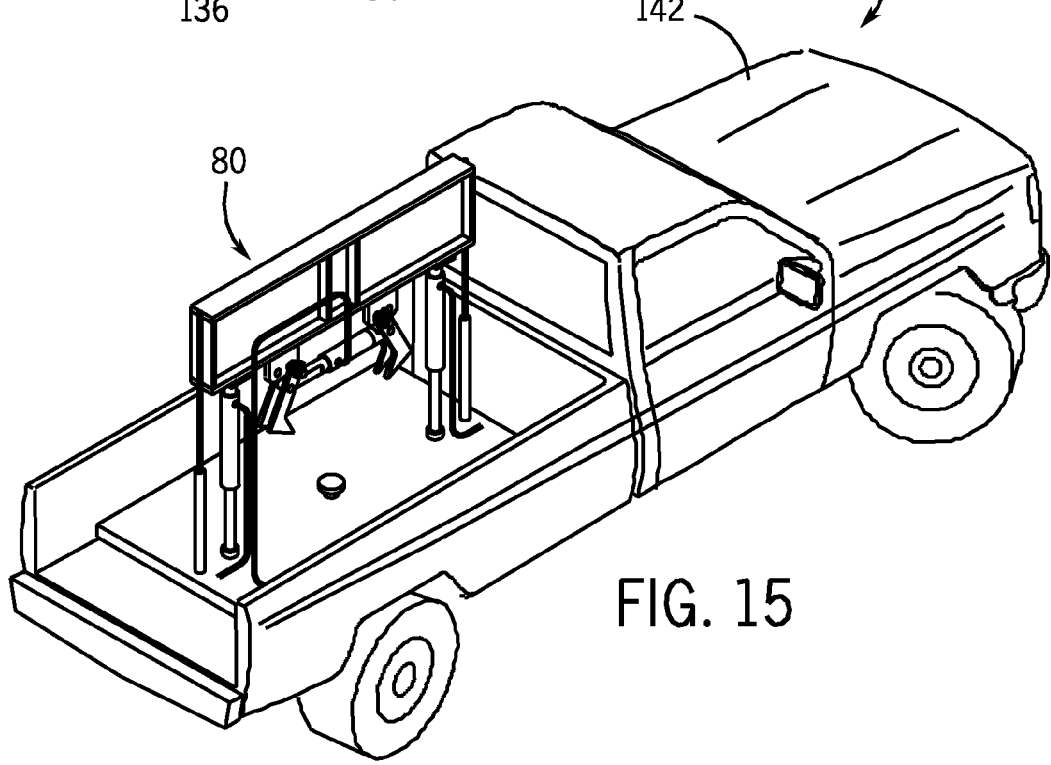

RAM PACKER EXTRACTION TOOL

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

More particularly, wellhead assemblies often include a blowout preventer, such as a ram-type blowout preventer that uses one or more pairs of opposing rams that press to one another to restrict flow of fluid through the blowout preventer. The rams typically include main bodies (or ram blocks) that receive sealing elements (or ram packers) that press together when a pair of opposing rams close against one another. The ram packers gradually wear and may be replaced as needed. But once installed and used in the ram blocks, the ram packers are often difficult to remove. Current techniques for removing the ram packers from the ram blocks include heating the packers to burn off elastomeric elements of the packers, freezing the packers (e.g., with liquid nitrogen) and breaking the elastomeric elements, using a chisel to gouge out pieces of the packer, and using a pry bar to remove the packer. Such techniques are frequently time consuming (in some instances taking hours), inefficient, and may even cause accidental damage to the ram block.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to systems and methods for removing a ram packer from a ram block. In some embodiments, an extraction system includes a pair of opposing jaws that engage and separate a ram packer from a ram block. The extraction system of one embodiment is hydraulically actuated, with a cylinder that opens and closes the opposing jaws and one or more additional cylinders that move the ram block and the jaws with respect to one another. Also, the ram block may be installed on a button that opposes the movement of the jaws to aid in separating the ram block and the ram packer.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 13 depicts brackets to secure a ram block for removal of a ram packer with the extraction tool in accordance with an embodiment of the present disclosure;

FIG. 15 illustrates installation of the extraction tool on a vehicle in accordance with an embodiment of the present disclosure.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
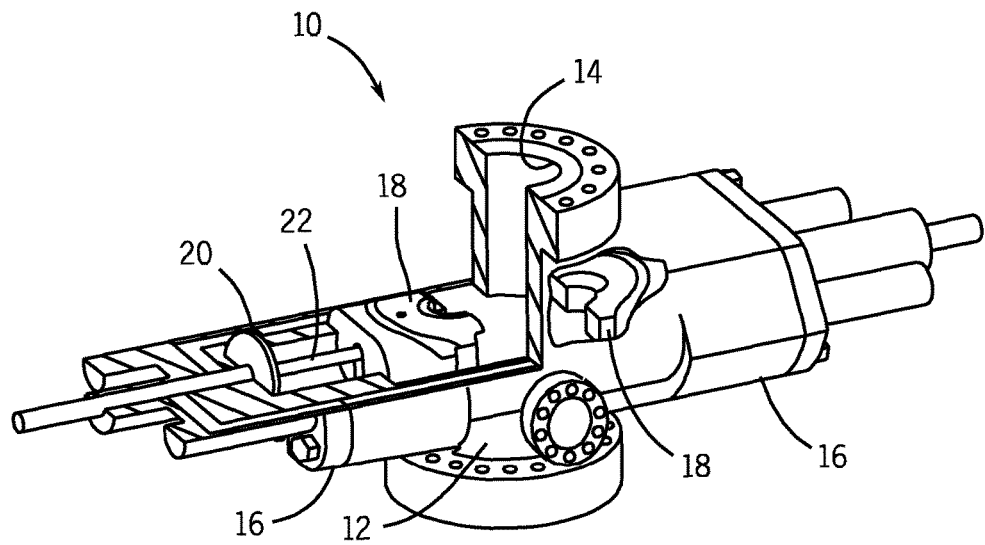
FIG. 1 generally depicts a blowout preventer having a pair of pipe rams that may be extended into a bore of the blowout preventer to restrict flow through the bore.

Embodiments of the present disclosure generally relate to removing ram packers from ram blocks. Rams with such packers and blocks are often used to restrict flow through bores of blowout preventers. A blowout preventer 10 is depicted in FIG. 1 by way of example. But it will be appreciated that numerous other blowout preventers include rams having ram packers that may also be removed in accordance with the present techniques.

The blowout preventer 10 includes a body 12, a bore 14 that enables passage of fluid or tubular members through the blowout preventer 10, and bonnet assemblies 16 mounted to the body 12. Each ram 18 inside the blowout preventer 10 is moved into or out of the bore 14 by an associated piston 20 and connecting rod 22 of a bonnet assembly 16. In the presently illustrated embodiment, the connecting rod 22 includes a button received in the ram 18 to allow the connecting rod 22 to push or pull the ram 18 within the blowout preventer 10.

Figure 2:
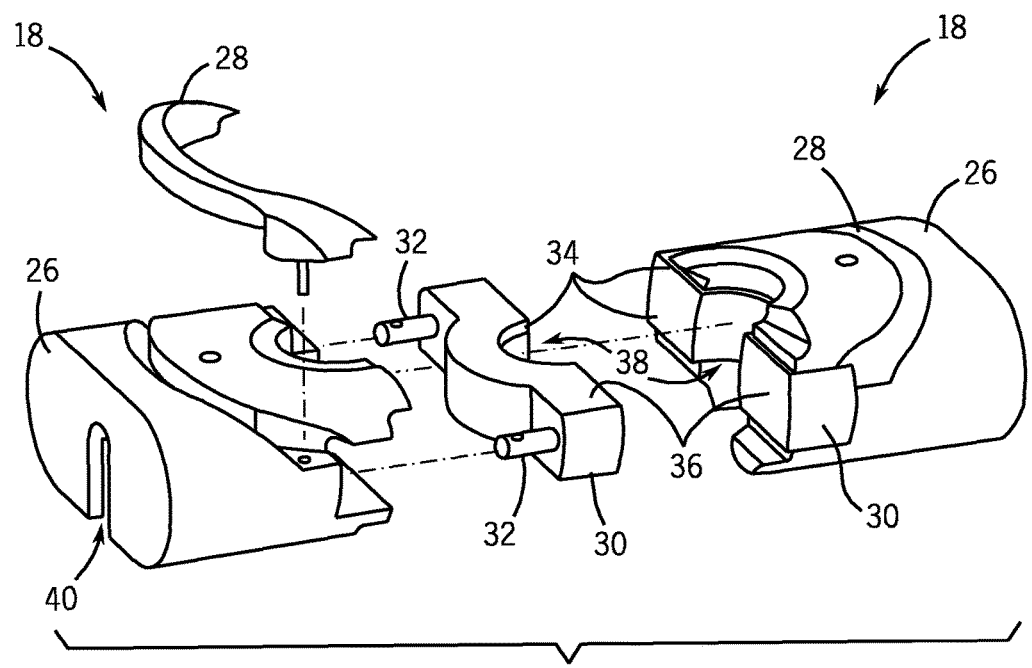
FIG. 2 is a perspective view of the pipe rams of FIG. 1 having ram blocks and ram packers in accordance with an embodiment of the present disclosure.

The rams 18 are depicted as pipe rams in FIG. 1, and are shown in greater detail in FIG. 2. Each ram 18 includes a body or ram block 26, a top seal 28, and a ram packer 30. The top seal 28 and the ram packer 30 include elastomeric materials that facilitate sealing by the ram 18 within the blowout preventer 10. The ram packer 30 includes alignment pins 32 that may be received in corresponding slots of the ram block 28 when the ram packer 30 is installed. As depicted, the alignment pins 32 also include slots for receiving pins of the top seal 28 when both the ram packer 30 and the top seal 28 are installed in the ram block 26. The ram packers 30 include plates 34 for rigidity and an elastomeric material 36 for sealing. The ram packers 30 have recesses 38 that allow a pair of opposing rams 18 to close about and seal against a tubular member (e.g., a pipe).

The rams 18 may be of any desired size and may vary depending on the intended application. For example, various pipe rams 18 may be sized for use with blowout preventers having a bore diameter of 7 1/16, 11, 13 5/8, and 18 3/4 inches. The recesses 38 may also be sized according to the diameter of the pipe about which the packers 30 are intended to seal (e.g., five inches). Additionally, in other embodiments, the rams 18 include variable-bore pipe rams that may be used to seal around pipes having a range of diameters (e.g., 2 7/8 to 4 inches, 2 7/8 to 5 inches, and 3 1/2 to 5 7/8 inches). Each ram 18 also includes a slot 40 for receiving a portion (e.g., a button) of a connecting rod 22, as discussed above, and the slot 40 may vary in size (e.g., based on the size of the ram 18).

Figure 3:
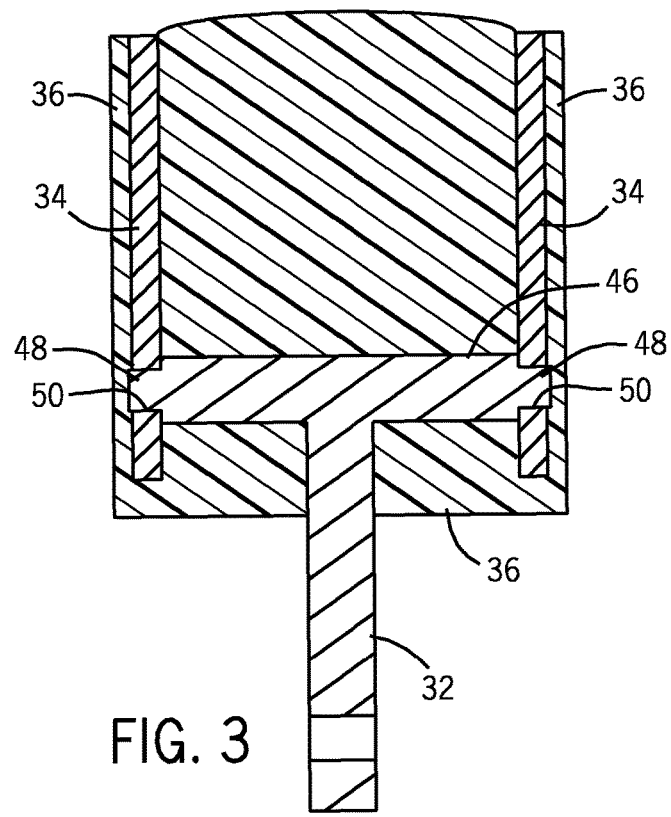
FIG. 3 is a cross-section of a ram packer of FIG. 2 depicting certain internal structural elements of the ram packer in accordance with an embodiment of the present disclosure.

Certain internal features of the ram packers 30, in accordance with one embodiment, are illustrated in FIG. 3. Particularly, this cross-section (taken along an alignment pin 32 perpendicular to the major axis of the ram packer 30) depicts a horizontal structural member or crossbar 46 extending between the plates 34 within the ram packer 30. The crossbar 46 may be formed integrally with the alignment pin 32, as depicted in FIG. 3, or may be formed separately. The crossbar 46 includes pin ends 48 received in apertures 50 of the plates 34. The alignment pins 32, the plates 34, and the crossbars 46 of the ram packer 30 may be formed of any suitable materials, such as steel. The elastomeric material 36 is formed about the plates 34 and the crossbar 46. Although the presently depicted embodiment includes plates 34 that are partially exposed, the plates 34 may be fully enclosed by the elastomeric material 36 in other embodiments.

Figure 4:
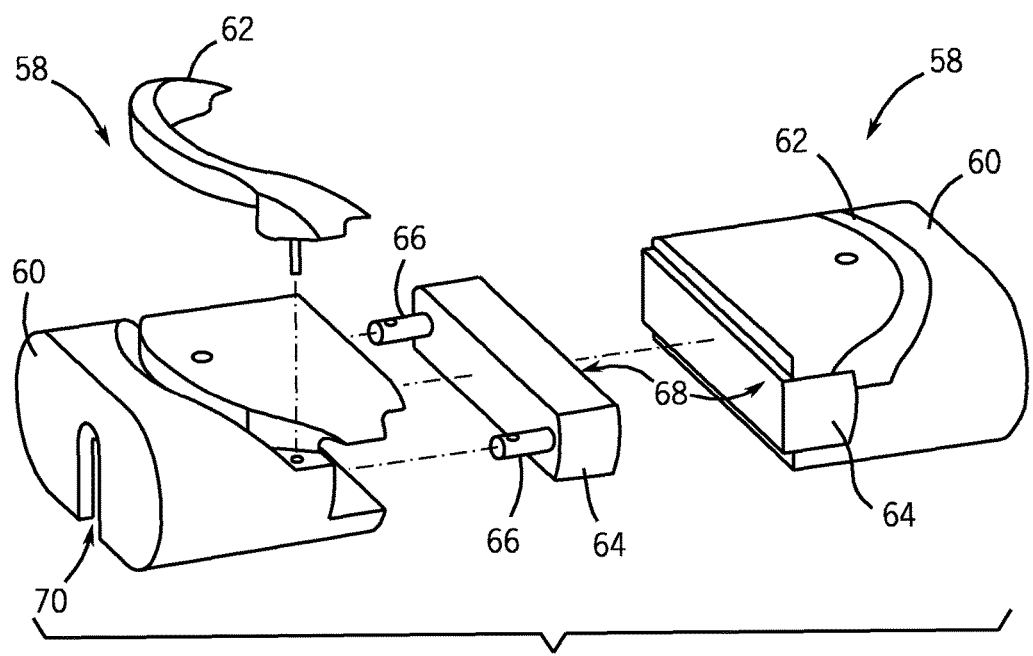
FIG. 4 is a perspective view of a pair of blind rams having ram blocks and ram packers in accordance with an embodiment of the present disclosure.

Although rams 18 are depicted in FIGS. 1 and 2 as pipe rams, other types of rams also include packers and may benefit from the present techniques. For example, as depicted in FIG. 4, blind rams 58 include ram blocks 60, top seals 62, and ram packers 64. Unlike the packers 30 of the rams 18, the packers 64 do not include a recess 38 for receiving a pipe. Consequently, when installed in blowout preventer 10, the pair of blind rams 58 may close against one another along surfaces 68 to seal the bore 14 (e.g., to close off a well). The ram packers 64 include alignment pins 66 similar or identical to alignment pins 32 of ram packers 30. Indeed, in some embodiments the ram packers 64 include an internal structure similar to that depicted in FIG. 3. Particularly, the ram packers 64 may also include plates coupled by a crossbar connected to an alignment pin as discussed above with respect to ram packer 30. And like the rams 18, the rams 58 include slots 70 for receiving connecting rods 22.

Figure 5:
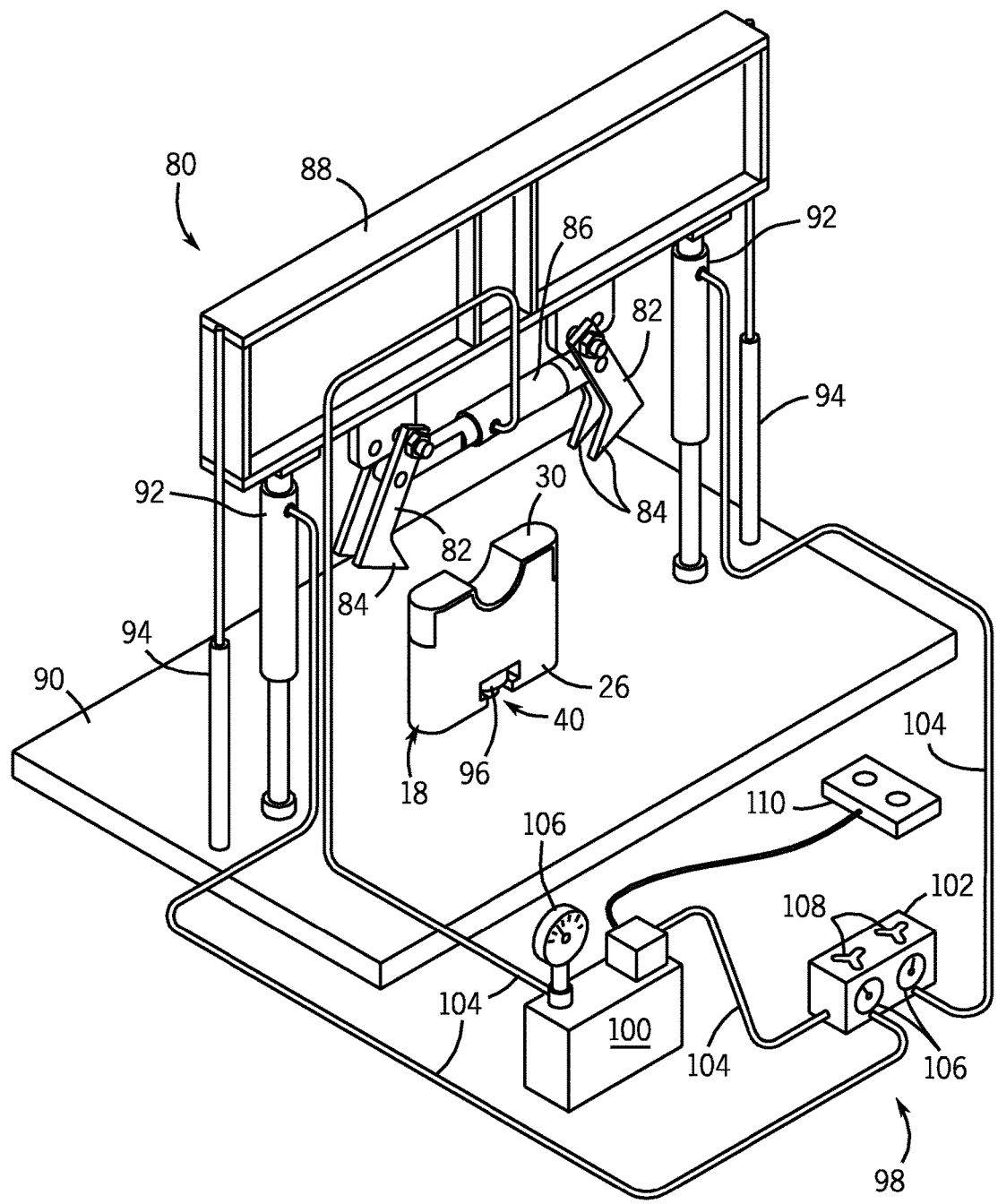
FIG. 5 is a perspective view of an extraction tool for removing ram packers from ram blocks in accordance with an embodiment of the present disclosure.

Once installed (and particularly after prolonged use), ram packers may be difficult to remove from their ram blocks. But the process of removing ram packers from ram blocks may be aided through use of the presently disclosed techniques. In accordance with one embodiment depicted in FIG. 5, an extraction tool or system 80 can be used to remove ram packers from their ram blocks. The system 80 includes pincers with opposing jaws 82 and teeth 84. In this embodiment, the jaws 82 are opened and closed by a hydraulic cylinder 86, and are suspended from a beam 88 in a manner that allows the jaws 82 to pivot to facilitate their opening and closing. A ram 18 is positioned below the jaws 82, such as on a base 90 (e.g., the ground or a platform). The beam 88 is connected to the base 90 by one or more hydraulic cylinders 92, which may extend or contract to control the distance between the beam 88 and the ram 18. In one embodiment, the hydraulic cylinder 86 is a 55-ton hydraulic cylinder and the hydraulic cylinders 92 are 10-ton hydraulic cylinders. Alignment guides 94 may also be provided as depicted in FIG. 5 (e.g., to reduce bending moments on beam 88).

As discussed in greater detail below, the jaws 82 can be used to remove the ram packer 30 from the ram block 26. During removal of the ram packer 30, the ram block 26 is retained on the base 90 by a button 96. Particularly, the button 96 is positioned within the slot 40 and prevents lifting of the ram block 26 from the base 90 when the ram packer 30 is pulled apart from the ram block 26.

In the depicted embodiment, a hydraulic control system 98 actuates the hydraulic cylinders. The control system 98 includes a hydraulic pump 100 and a proportioning valve 102 connected to the cylinders 86 and 92 by hoses 104. Gauges 106 allow a user to monitor the control system 98. Additionally, valve handles 108 allow an operator to vary output between the depicted cylinders 92 (e.g., allowing fine adjustment of each side of the beam 88 via one of the pair of illustrated cylinders 92). In the embodiment of FIG. 5, a remote control 110 is provided to control operation of the hydraulic cylinders 86 and 92, which in turn control the opening or closing of the jaws 82 and their vertical position. But in other implementations, the control system 98 may vary from that depicted in FIG. 5. For instance, one or more manual hydraulic pumps could instead be used to actuate the cylinders 86 or 92.

Figure 6:
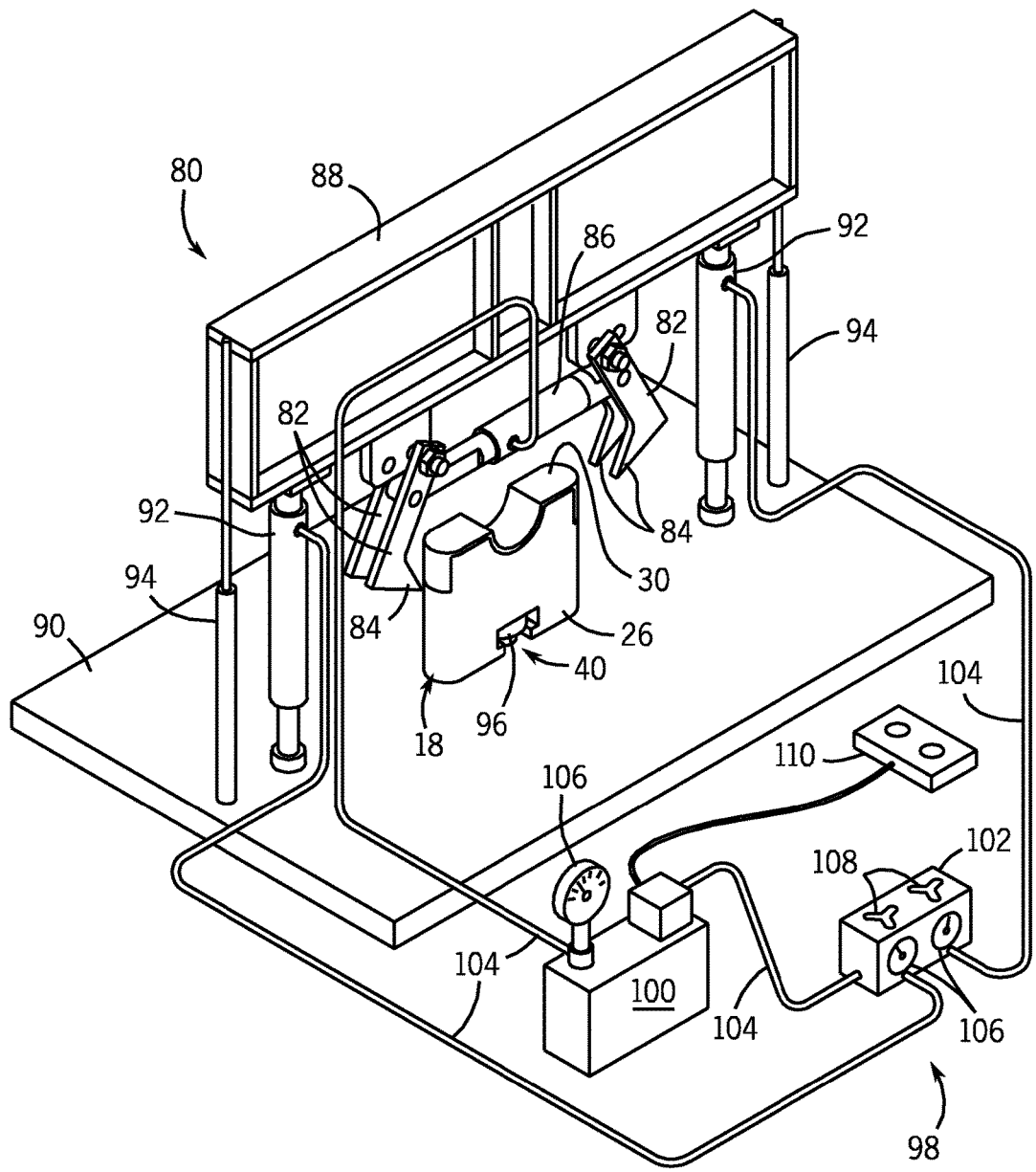
FIG. 6 illustrates alignment of jaws of the extraction tool of FIG. 5 with a ram packer and a ram block in accordance with an embodiment of the present disclosure.
Figure 7:
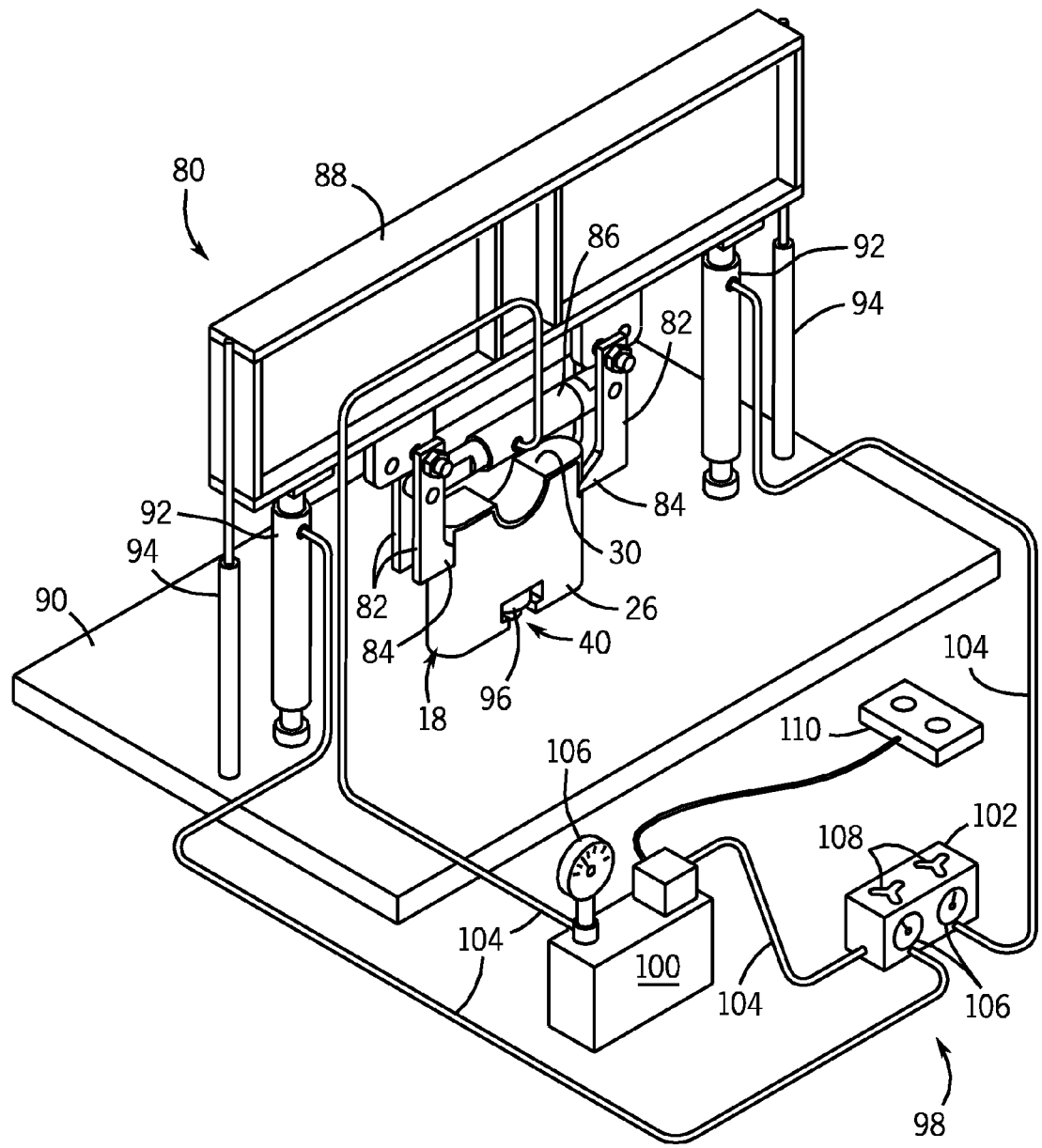
FIG. 7 illustrates closing of the jaws of the extraction tool of FIG. 5 to engage the ram packer installed in the ram block in accordance with an embodiment of the present disclosure.
Figure 8:
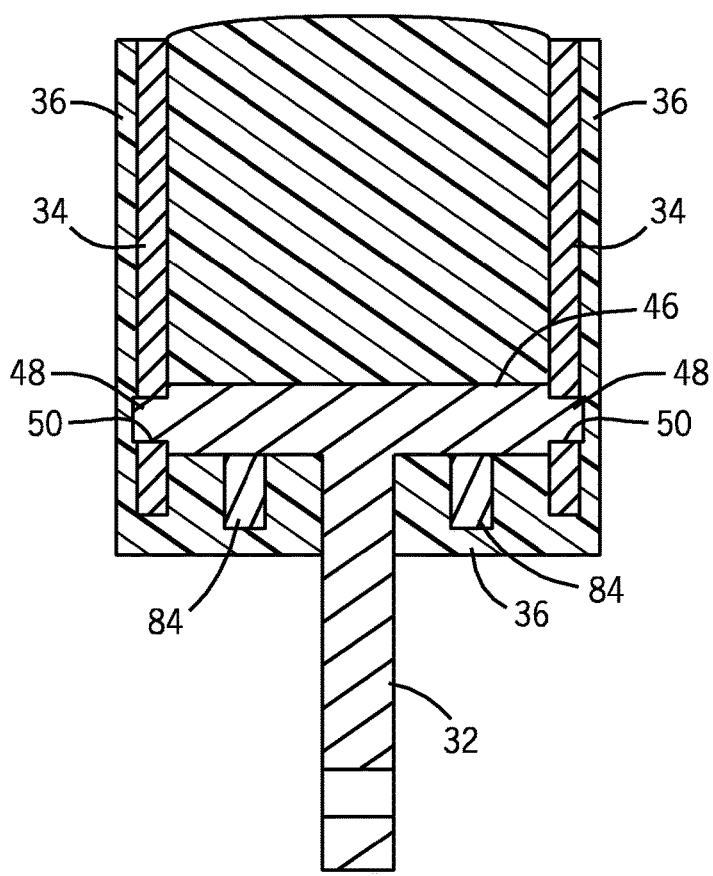
FIG. 8 is a cross-section of the ram packer of FIG. 7, depicting insertion of teeth of the jaws of the extraction tool below a crossbar of the ram packer in accordance with an embodiment of the present disclosure.
Figure 9:
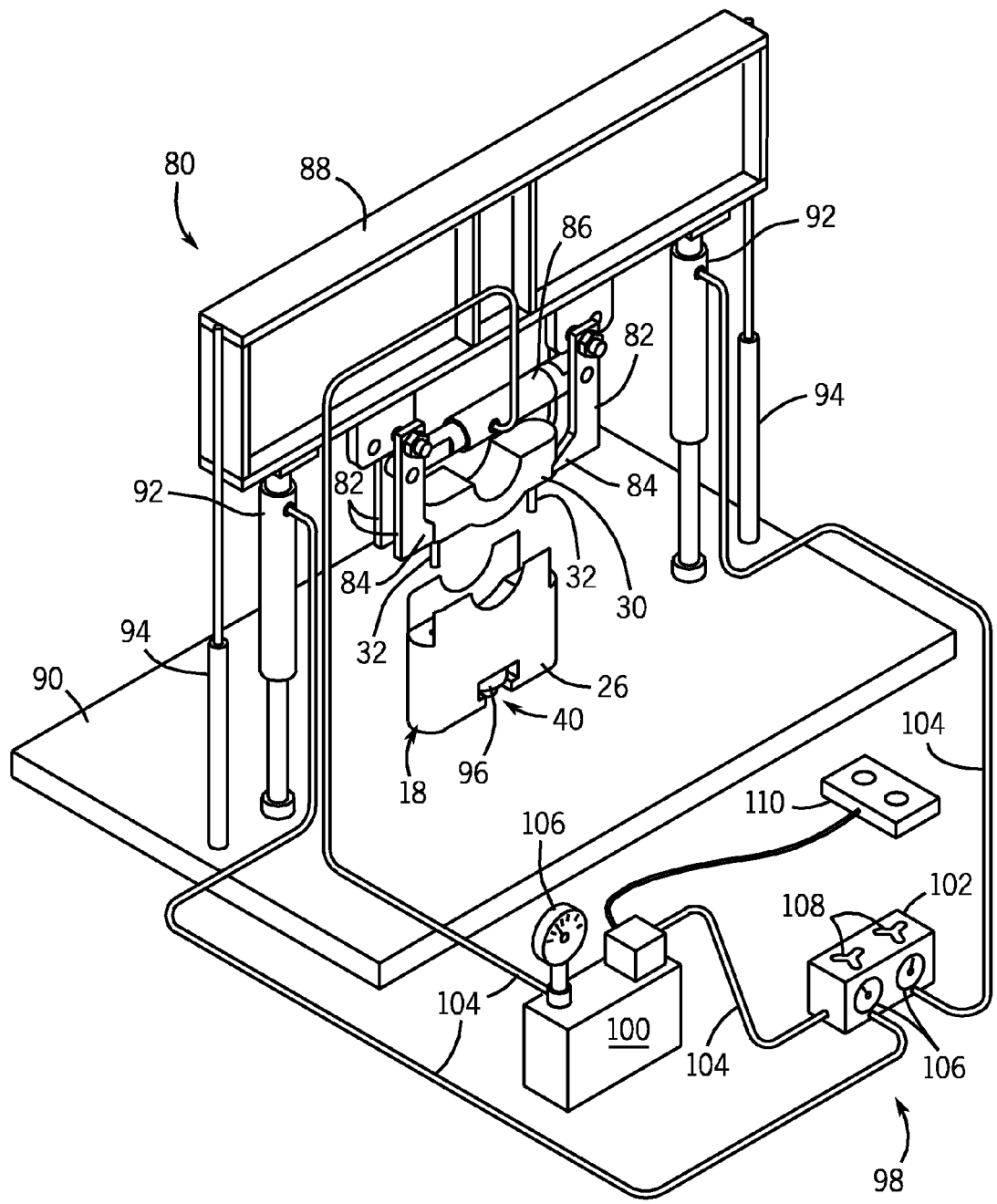
FIG. 9 illustrates removal of the ram packer from the ram block with the extraction tool of FIG. 5 in accordance with an embodiment of the present disclosure.

Operation of the system 80 to extract a ram packer from a ram block may be better understood with reference to FIGS. 6-9, which are provided in accordance with one embodiment. Once a ram (e.g., ram 18) is positioned on the base 90, the cylinders 92 are used to lower the beam 88 and align the jaws 82 with respect to the ram packer 30. Particularly, as depicted in FIG. 6, the teeth 84 of the jaws 82 may be aligned with the interface between the ram packer 30 and the ram block 26 in which it is installed. In FIG. 7, the jaws 82 are closed by cylinder 86 such that the teeth 84 engage and grip the ram packer 30. More specifically, in one embodiment the teeth 84 of each jaw 82 may be wedged beneath a crossbar 46 and about an alignment pin 32 of the ram packer 30 as depicted in FIG. 8. The cylinders 92 are then activated to raise the beam 88 away from the ram block 26 (which is retained with the base 90 by the button 96) and to pull the ram packer 30 from the ram block 26, as depicted in FIG. 9. While previous techniques for removing ram packers (e.g., burning, freezing, or gouging) were frequently time-consuming and may have taken hours, use of the system 80 may allow for the removal of ram packers in a small fraction of the time (e.g., in a few minutes).

In some instances, it may be difficult to position the teeth 84 beneath the crossbars 46. But in such instances, the jaws 82 may be closed to insert the teeth 84 into the elastomeric material 36 near the crossbars 46 and the jaws 82 may be raised to loosen the elastomeric material 36 near the crossbars 46. Then, the jaws 82 may be opened, lowered (to realign the teeth 84 with the ram packer 30), and closed again to engage the ram packer 30 and remove it from the ram block 26.

Also, while the operational example described with respect to FIGS. 6-9 references movement of the beam 88 to raise and lower the jaws 82, other arrangements are also contemplated. For instance, the jaws 82 may be held at a constant vertical position and the ram block 26 may be moved to and away from the jaws 82. In other words, the jaws 82 may engage and hold the ram packer 30 while a movable base 90 pulls the ram block 26 away from the packer 30. Also, other embodiments may differ in additional ways. In one embodiment, for example, some or all of the components of the system 80 may be enclosed within a barrier to contain any accidental pressure releases.

Figure 10:
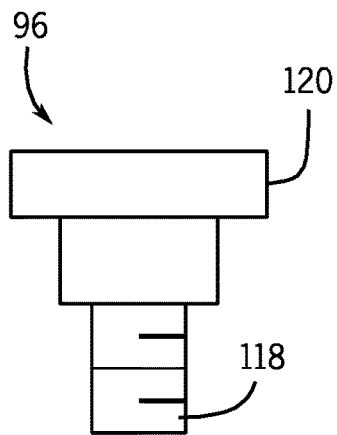
FIGS. 10-12 are examples of interchangeable buttons that may be attached to a base of FIG. 5 to receive ram blocks of different sizes and retain the ram blocks during removal of ram packers from the ram blocks with the extraction tool.
Figure 11:
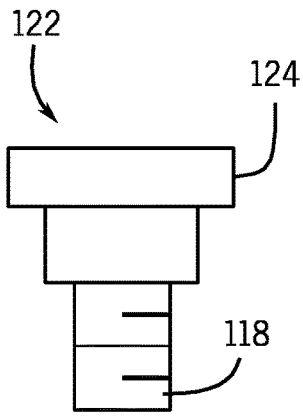
Figure 12:
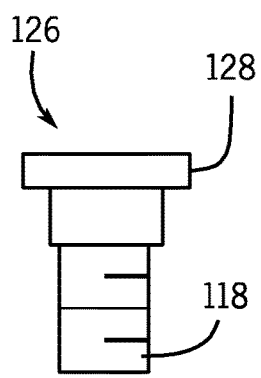

As previously noted, the slots 40 and 70 of rams may vary depending on the size of the rams. To accommodate a wider range of ram sizes, the system 80 may use a set of interchangeable buttons for retaining the rams with the base 90 during removal of a ram packer. Examples of such buttons are depicted in FIGS. 10-12. The set of buttons includes the button 96 referenced above with respect to FIG. 5. The button 96 has a threaded shank portion 118 (which may be received in a correspondingly threaded hole of the base 90) and a head 120 for engaging a ram block (e.g., 26 or 60) when the head 120 is inserted into a slot (e.g., 40 or 70) in the ram block. Similarly, buttons 122 and 126 have heads 124 and 128 of different sizes for engaging different ram blocks (also having differently sized slots). Buttons 122 and 126 also include threaded shank portions 118 of the same size as that of button 96, allowing the buttons to be interchanged with one another on the base 90. Consequently, the system 80 may be adapted for use with rams of different sizes by selecting and installing appropriate buttons with sizes corresponding to the rams. Also, it is noted that the heads 120, 124, and 128 may be sized similarly to buttons on the end of the connecting rods 22 (FIG. 1) used for moving particular rams.

In some embodiments, the system 80 includes additional retaining features to inhibit motion of the ram block 26 on the base 90. For example, as generally depicted in FIG. 13, the base 90 may include brackets 134 that slide on rails 136 to engage and hold the ram block 26 during removal of the ram packer 30. The brackets 134 may inhibit rotation of the ram block 26 about the button 96, reducing bending moments in the system 80. In another embodiment, the base 90 includes holes adjacent the ram block 26 and securing pins may be inserted into the holes such that the pins extend above the surface of the base 90 and inhibit rotation of the ram block 26. And multiple holes may be provided at different locations on the base 90 to accommodate ram blocks of varying size.

Figure 14:
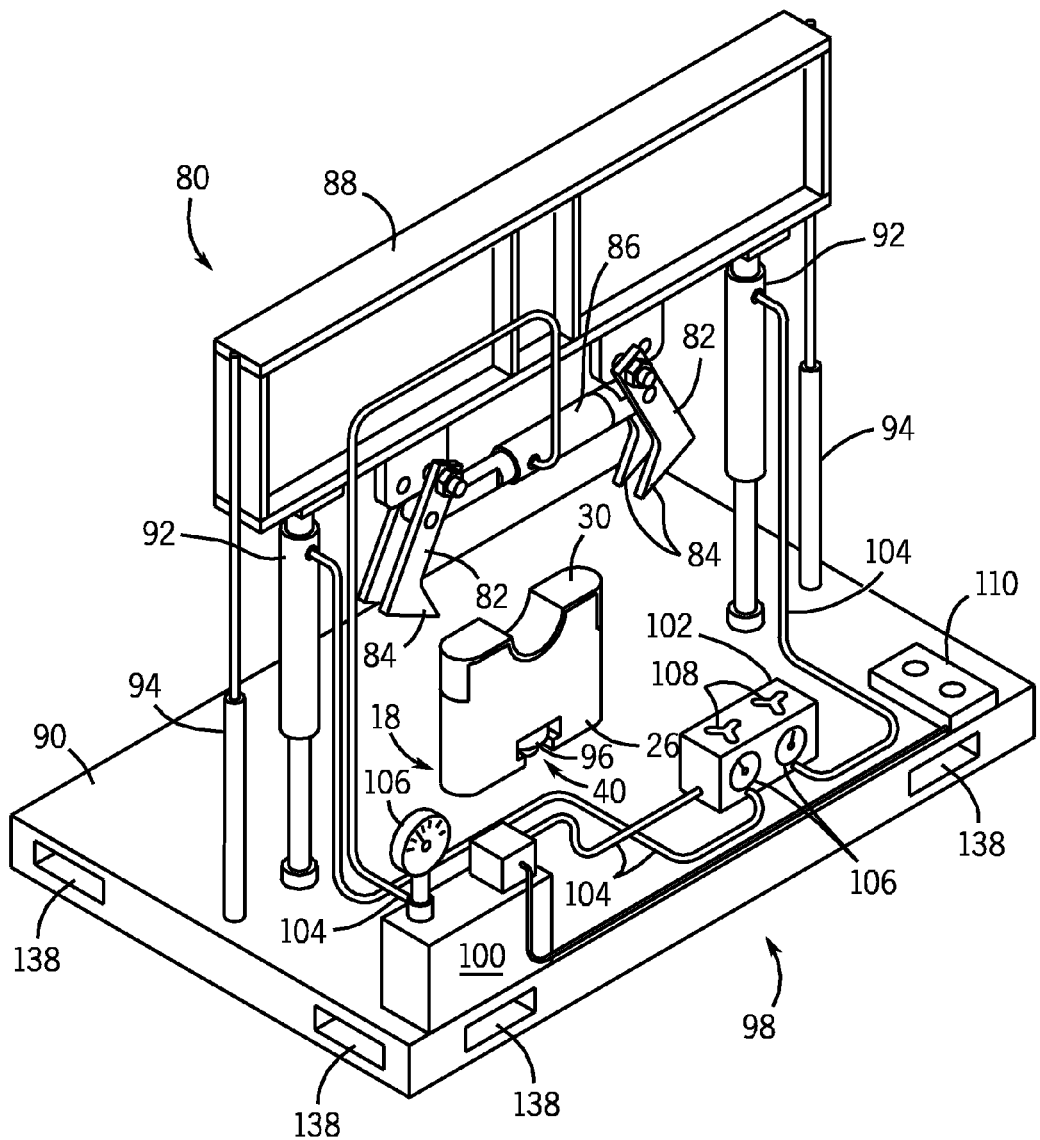
FIG. 14 depicts the extraction tool as having a platform with slots that facilitate movement of the extraction tool by a forklift in accordance with an embodiment of the present disclosure.
Figure 16:
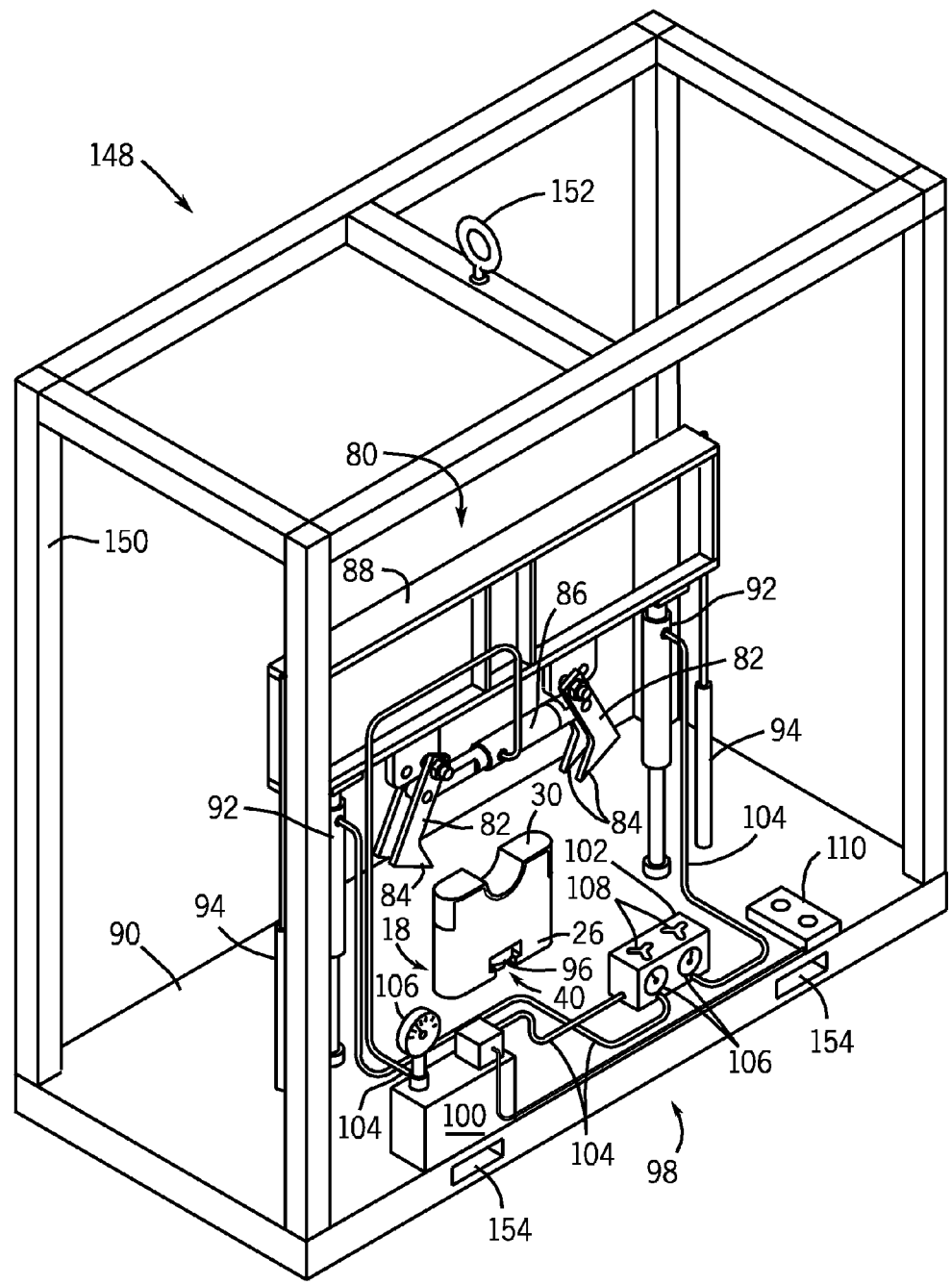
FIG. 16 depicts the extraction tool as installed on a skid in accordance with an embodiment of the present disclosure.

Additionally, although the system 80 may be installed at a fixed location, it may also be configured for other installations or use. In one embodiment depicted in FIG. 14, for instance, the base 90 is a platform including multiple slots 138 that allow the system 80 to be lifted and moved by a forklift. Also, as depicted in FIG. 15, the extraction system 80 may be part of a mobile system 140 in which the extraction tool is installed on a vehicle, such as a service truck 142. Or the extraction system 80 may be set on the vehicle for transport to and offloading at another location, such as a field location. And in another embodiment generally depicted in FIG. 16, the system 80 is mounted on a skid 148. In addition to the base 90, the skid 148 includes a frame 150 and a hook 152 that allow the system 80 to be lifted by a crane or a winch line and more easily transported (e.g., to an offshore rig). The skid 148 also includes lift points 154 to enable lifting and movement of the system 80 by a forklift.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method to remove a ram packer from a ram block, the method comprising:
   receiving a ram block including a ram packer;
   aligning opposing jaws with respect to the ram packer;
   closing the opposing jaws to engage the ram packer; and
   moving the closed, opposing jaws away from the ram block to pull the ram packer from the ram block;
   wherein aligning the opposing jaws includes aligning teeth of the opposing jaws with the ram block and the ram packer, and wherein closing the opposing jaws to engage the ram packer includes inserting the teeth of the opposing jaws into an elastomeric material of the ram packer.

2. The method of claim 1, wherein closing the opposing jaws to engage the ram packer includes closing the opposing jaws to insert teeth of each of the opposing jaws into the ram packer such that the teeth of each of the opposing jaws are positioned about a respective pin extending from the ram packer into the ram block and are positioned under a crossbar connected to the respective pin within the ram packer.

3. The method of claim 1, wherein receiving the ram block includes receiving the ram block about a button such that the button retains the ram block during moving of the closed, opposing jaws away from the ram block to pull the ram packer from the ram block.

4. The method of claim 3, comprising receiving the button in a threaded hole of a platform.

5. The method of claim 1, wherein aligning the opposing jaws, closing the opposing jaws, and moving the closed, opposing jaws away from the ram block are performed with hydraulic cylinders in response to user input.

6. The method of claim 1, comprising:
receiving an additional ram block of a different size;
aligning the opposing jaws with an additional ram packer installed in the additional ram block;
closing the opposing jaws to engage the additional ram packer; and
moving the closed, opposing jaws away from the additional ram block to pull the additional ram packer from the additional ram block.

7. The method of claim 1, wherein closing the opposing jaws to engage the ram packer includes wedging the teeth of the opposing jaws between the ram block and crossbars of the ram packer within the elastomeric material.

* * * * *